United States Patent [19]
Harrison et al.

[11] 3,988,257

[45] Oct. 26, 1976

[54] EPOXY RESIN ACCELERATOR

[75] Inventors: Tony Harrison, Maidenhead; Roger G. Weatherhead, Epsom, both of England

[73] Assignee: Shell Oil Company, Houston, Tex.

[22] Filed: Sept. 29, 1975

[21] Appl. No.: 617,349

Related U.S. Application Data

[62] Division of Ser. No. 534,952, Dec. 20, 1974, Pat. No. 3,945,971.

[30] Foreign Application Priority Data
Jan. 3, 1974  United Kingdom............... 279/74

[52] U.S. Cl................................ 252/182; 260/2 N; 260/47 EN; 427/410; 428/262
[51] Int. Cl.².......................................... C08G 59/56
[58] Field of Search............... 252/182; 260/47 EN, 260/2 N, 59, 18 PF; 428/262; 427/410

[56] References Cited
UNITED STATES PATENTS

| | | | |
|---|---|---|---|
| 3,294,749 | 12/1966 | Pratt | 260/47 EN |
| 3,759,914 | 9/1973 | Simms et al. | 260/2 N |

*Primary Examiner*—Benjamin R. Padgett
*Assistant Examiner*—Irwin Gluck
*Attorney, Agent, or Firm*—Martin S. Baer

[57] ABSTRACT

A process for preparing cured epoxy resins, the cured epoxy products, and the curing composition employed, are disclosed. The process comprises contacting an epoxy resin with the curing composition, i.e., a polyamine curing agent and a phenyl urea accelerator.

4 Claims, No Drawings

EPOXY RESIN ACCELERATOR

This is a division of application Ser. No. 534,952, filed Dec. 20, 1974, now U.S. Pat. No. 3,945,971.

BACKGROUND OF THE INVENTION

This invention relates to a process for curing epoxy resins. More particularly, this invention relates to the low temperature curing of epoxy resins with polyamine curing agents. Specifically, the invention provides for a process to cure epoxy resins which comprises contacting the epoxy resin with a polyamine curing agent in the presence of a phenyl urea accelerator.

THE PRIOR ART

Epoxy resins, also called polyepoxides, are a broad class of organic compounds containing the oxirane structure

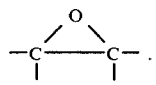

Epoxy resins are widely used as adhesives, castings, surface coatings, electrical insulation and the like. However, the pure epoxy resin is not thermosetting and must be reacted with a curing agent and/or accelerator to convert the epoxy resin into a resinified, cross-linked, polymeric, thermoset plastic.

When considering the curing process, there are essentially two classes of curing agents — low temperature curing agents and high temperature curing agents. The high temperature curing agents require the application of heat to complete the cross-linking within a reasonable time. Representative of high temperature curing agents are polycarboxylic acids and their anhydrides, polycarboxylic acid polyhydrazides, polyhydric phenols and dicyandiamide. With the other class of curing agents — low temperature curing agents — application of heat is usually unnecessary. Among the common low temperature curing agents are polyamines such as polymers of alkyleneamines.

In order to increase the rate of curing of epoxy resins, compounds called accelerators are employed. For example, May et al., U.S. Pat. No. 3,420,794, teaches that dicyandiamide may be employed as an accelerator when curing a polyepoxide with a polyamine. Pratt, U.S. Pat. No. 3,294,749, employs certain substituted urea derivatives as accelerator in the high temperature curing of polyepoxides. Other accelerators include guanyl urea and ethylene thiourea as taught in U.S. Pat. No. 3,420,794, and N-(di)alkyl-N'-(substituted) phenyl urea as taught in British Pat. No. 1,192,790. The accelerators typically used in the low temperature curing of epoxy resins are phenols such as hydroxybenzene and cresols. Phenol accelerators have the advantage of dissolving readily at ambient temperatures in a large number of liquid amino curing agents, and in liquid epoxy resins, and also have good accelerating activity. However, the typical phenol accelerators impart odor and toxicity to the resin, which prevent their use in certain applications. It has now been found that certain urea derivatives are particularly suitable accelerators for the polyamine curing of epoxy resins.

SUMMARY OF THE INVENTION

The invention relates to a process for preparing cured epoxy resins comprising contacting at relatively low temperatures an epoxy resin having an epoxy equivalency greater than 1.0 with a polyamine curing agent having more than one non-tertiary amino group per molecule in the presence of a phenyl urea accelerator. The invention also contemplates the curing composition of polyamine curing agent and phenyl urea accelerator as well as the cured product obtained by contacting the epoxy resin and the curing composition.

DETAILED DESCRIPTION OF THE INVENTION

According to the present invention, epoxy resins having an epoxy equivalency greater than 1.0 are cured at relatively low temperatures by contacting the epoxy resin with a polyamine curing agent having more than one non-tertiary amino group per molecule in the presence of an accelerator of the general formula:

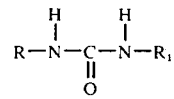

wherein
R is

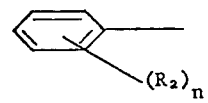

$R_2$ is selected from the group consisting of an alkyl group containing from 1 to 4 carbon atoms, chlorine and bromine, $n$ is 0, 1 or 2, and $R_1$ is selected from the group consisting of R and H.

The epoxy resins to be cured according to the present invention are either liquid or solid at ambient temperature and have an epoxy equivalency greater than 1.0. Epoxy equivalency is defined as the number of epoxy groups per epoxy resin molecule based on an average or effective molecular weight.

Epoxy resins which are solid at ambient temperature are combined with a solvent before curing. Suitable solvents for such resins include ketones, such as acetone and methyl isobutyl ketone; esters, such as ethyl acetate and ethylene glycol acetate; ethers such as ethylene glycol mono-n-butylethers; and aromatics, such as xylene or toluene.

Preferably the epoxy resins are liquid at ambient temperature. Such epoxy resins are saturated or unsaturated, aliphatic, cycloaliphatic, aromatic or heterocyclic and are substituted, if desired, with substituents, such as halogen atoms, hydroxy groups or ether groups. Acceptable epoxy resins are both monomeric and/or polymeric. Preferred liquid epoxy resins are the polyglycidyl ethers of polyhydric phenols and polyhydric alcohols. Particularly preferred are the diglycidyl ethers of 2,2-bis(4-hydroxyphenyl)propane or bis-(4-hydroxyphenyl)methane which are prepared by reacting epichlorohydrin with the appropriate phenol in the presence of alkali. Preferably the liquid epoxy resin has an epoxide equivalent weight of from about 155 grams to about 250 grams. Epoxide equivalent weight is defined as follows:

Epoxide equivalent weight =
$$\frac{\text{(grams epoxy resin)}}{\text{(effective molecular weight) (epoxy equivalency)}}$$

Some liquid epoxy resins have high viscosities and it is often advantageous to employ viscosity modifiers to improve the ease of handling of the resin. The viscosity modifiers employed are reactive or nonreactive. Suitable viscosity modifiers include liquid mono-or diglycidyl ethers of alcohols or phenols, such as butanol, monoethylene glycol or cresol; liquid monoglycidyl esters of monocarboxylic acids such as Versatic Acid; esters, such as ethyl acetate, butyl acetate, ethylene glycol monomethyl ether acetate, ethylene glycol monoethyl ether acetate; ethers such as methyl-, ethyl-, or butyl ethers of ethylene glycol or diethylene glycol; aromatic hydrocarbons such as benzene, toluene or xylene; alcohols such as methanol, ethanol, isopropyl alcohol or n-butyl alcohol; and mixtures thereof. When a viscosity modifier is employed, the weight ratio of viscosity modifier to epoxy resin is typically between about 0.01:1 to about 0.2:1. The viscosity of the liquid epoxy resin or of the liquid epoxy resin modified with a viscosity modifier is preferably less than about 160 poise at 25° C, more preferably less than about 100 poise at 25° C.

The polyamine curing agents employed have more than one nontertiary amino group per molecule, the amino group being a primary and/or a secondary amino group, and are solid or liquid at ambient temperatures, with the latter being preferred. Suitable liquid polyamine curing agents include aromatic polyamines, e.g. ortho, meta, or para xylylene diamines; aliphatic polyamines, e.g. ethylene diamine, diethylene triamine and trimethylhexamethylene diamine; cycloaliphatic polyamines, e.g. 1-amino-3-amino methyl-3,5,5-trimethyl-cyclocohexane (isophorone diamine), 3,3'-dimethyl-4,4'-diaminodicyclohexylmethane, 4,4'-diaminodicyclohexylmethane and N-cyclohexyl n-propylene diamine (cyclohexylpropylene diamine) and ortho, meta or para bis(aminomethyl)cyclohexane; and polyamides. Preferred liquid polyamine curing agents are cycloaliphatic polyamines, in particular those having two primary amino groups, such as isophorone diamine. If desired, liquid polyamine curing agents are diluted with diluents, such as benzyl alcohol, dibutylphthalate, furfuryl alcohol or pine oil.

The amount of polyamine curing agent used in the present invention depends on the nature of the polyamine and the epoxy resin to be cured. Generally, the weight ratio of polyamine curing agent to epoxy resin is from about 0.05:1 to about 1.5:1, preferably about 0.1:1 to about 1:1.

The accelerators, as defined above, accelerate the epoxy resin/polyamine curing agent reaction but are not capable alone of curing epoxy resins to any substantial degree at ambient temperatures.

In general from about 0.005 to about 0.1, preferably about 0.02 to about 0.07 moles of the accelerator are used per 100 parts of the epoxy resin to be cured. Suitable accelerators include, for example, m-ethylisopropylphenyl urea, ethylphenyl urea, isobutylphenyl urea, chlorophenyl urea, bromophenyl urea, and N-phenyl-N'-ethylphenyl urea. Preferred accelerators are phenyl urea and 1,3-diphenyl urea. The accelerator is added to the epoxy resin and/or polyamine curing agent before the epoxy resin and polyamine curing agent are reacted. Alternatively, the accelerator is added separately to the reaction mixture. In general, it is desirable to add the accelerator to the polyamine curing agent, the advantage being that the above accelerators are soluble in most of the polyamine curing agents which are liquid at ambient temperatures.

According to another aspect of the invention a curing composition suitable for use in the above process comprises a solution of an accelerator of the general formula:

$$R-N(H)-C(=O)-N(H)-R_1$$

wherein
R is

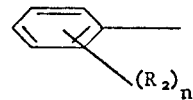

$R_2$ is selected from the group consisting of an alkyl group containing from 1 to 4 carbon atoms, chlorine and bromine,
$n$ is 0, 1 or 2, and
$R_1$ is selected from the group consisting of R and H, and a polyamine curing agent having more than one non-tertiary amine group per molecule. The amount of accelerator in the curing composition is from about 0.005 moles per 100 parts epoxy resin to about 0.07 moles per 100 parts epoxy resin.

The polyamine curing agent in the presence of the accelerator is capable of curing the epoxy resin at relatively low temperatures. Curing must obviously take place within a period of time acceptable to those persons preparing cured epoxy resins. Such an acceptable period of time depends on the bulk of the system being handled, the thickness of the layer of system being applied and the temperature of the system and substrate but is usually from about 15 minutes to about 6 hours for gellation and from about 1 to about 2 weeks for development of satisfactory methanical properties. Useful temperatures vary considerably, and are typically between about 0° C and about 50° C. However, preferred temperatures are usually between about 5° C and about 35° C.

Other types of materials such as fillers, stabilizers, plasticizers, insecticides, fungicides, extenders, pigments, and the like, are also included in the cured epoxy resin composition. Examples of fillers include aluminum powder, asbestos, powdered mica, and zinc dust, while examples of extenders include alkylated phenols and petroleum distillates.

The process according to the present invention is particularly useful for preparing insoluble and infusible cured epoxy resins for use in adhesives, coatings, floorings, laminates, and civil engineering applications.

The present invention has a number of advantages over the accelerators typically employed in the art; one advantage being that the present accelerators allow the cure to be carried out at low temperatures, notably between about 0° C and about 15° C, in which situation cure without an accelerator is unacceptably slow and cure with known accelerators is not desired. Another advantage of the present accelerators is that they do not impart odor or toxicity to the cured epoxy resin as do the typical phenol accelerators. In addition, as shown in the following Illustrative Embodiments, the present accelerators have greater accelerating activity than do many of the known accelerators.

The invention is further illustrated by means of the following Illustrative Embodiments. Note that the embodiments are for the purpose of illustration only and that the invention is not to be regarded as limited to any of the specific conditions or reactants recited therein.

Various expressions in the Embodiments have the following meaning:

Tecam gel time: determined according to British Standard 2782 method 111 D except that the test was carried out in a constant temperature room instead of in an oil bath. Gel times were determined on 100 ml samples in unlagged containers.

Polyepoxide B: a liquid polyglycidyl ether of 2,2-bis-(4-hydroxyphenyl)-propane diluted with 15 weight per cent of a mixture of glycidyl esters of saturated aliphatic monocarboxylic acids in which the carboxyl group is attached to a tertiary or quaternary carbon atom; viscosity 15 poise at 25° C, epoxy equivalent weight 200.

Polyepoxide C: a liquid polyglycidyl ether of 2,2-bis-(4-hydroxyphenyl)-propane, diluted with 10 weight per cent of cresyl glycidyl ether; epoxy equivalent weight 200.

Curing Agent A: cyclohexyl propylene diamine.

Curing Agent B: liquid mixture of cycloaliphatic polyamines.

Curing Agent C: Synolide 960 (a commerical polyamino amide of dimerized unsaturated fatty acids).

ILLUSTRATIVE EMBODIMENT I

The Tecam gel times at 2° and 23° C of the following formulations were determined:
Polyepoxyde B — 100 g
isophorone diamine — 24 g
accelerator — 0.05 mole.

The accelerators were dissolved in the isophorone diamine. Polyepoxide and curing agent mixture were conditioned at the test temperature before mixing.

The results for different accelerators are given in Table 1.

TABLE I

| Accelerator | Tecam gel time, minutes | |
| --- | --- | --- |
| | 2° C | 23° C |
| (1) None | 710 | 130 |
| (2) Urea | 200 | 40 |
| (3) 1,3-Dimethyl urea | 385 | 65 |
| (4) 1,1-Dimethyl urea | 370 | 50 |
| (5) 1-Methyl urea | 300 | 50 |

TABLE I-continued

| Accelerator | Tecam gel time, minutes | |
| --- | --- | --- |
| | 2° C | 23° C |
| (6) 1-Phenyl urea | 95 | 16 |
| (7) 1,3-Diphenyl urea | 80 | 16 |
| (8) Cresylic acid | 340 | 40 |

ILLUSTRATIVE EMBODIMENT 2

The Tecam gel times at 23° C of the following formulations with various curing agents, with and without accelerators, were determined:
Polyepoxide B — 100 g
Curing agent (and amount) — see Table 2
Accelerator — 0.05 mole.

The accelerators were dissolved in the liquid curing agent prior to the curing process. Polyepoxide and curing agent mixture were conditioned at the test temperature before mixing.

Further details of formulations and the results are given in Table 2.

TABLE 2

| | Accelerator | None | Phenol | 1-Phenyl urea |
| --- | --- | --- | --- | --- |
| Curing agent, g | | Tecam (min.) | Tecam (min.) | Tecam (min.) |
| A | 26 | 180 | 42 | 16 |
| B | 40 | 165 | 55 | 26 |
| C | 80 | 407 | 200 | 58 |

ILLUSTRATIVE EMBODIMENT 3

Illustrative Embodiment 3 reveals the cure characteristics at low temperature of various accelerated epoxy resin/amine systems. Mod-Epox and salicylic acid are conventional accelerators for epoxy resin/amine cure. The compositions of the formulations and the evaluations are presented in Table 3. Note that the values for tensile strength in Table 3 are the averages of a series of determinations. In Table 3, "*" indicates a very brittle composition while "B" indicates that the sample was too brittle to test.

TABLE 3

| | | | | |
| --- | --- | --- | --- | --- |
| Composition, parts by weight | Polyepoxide C | 100 | 100 | 100 |
| | Curing agent B | 40 | 40 | 40 |
| | Mod-Epox | 5 | — | — |
| | Salicyclic acid | — | 3.5 | — |
| | Phenyl urea | — | — | 3.4 |
| Tensile strength at break, MN/m² | 7 days cure at 23° C. Tested at 23° C | 52 | 46 | 53 |
| | 7 days cure at 10° C. Tested at 10° C | 7* | B | 22 |
| | 14 days cure at 10° C. Tested at 10° C | 14 | B | 27 |
| | 14 days cure at 10° C. + 7 days cure at 23° C. Tested at 23° C | 44 | B | 56 |

We claim as our invention:

1. A curing composition for curing epoxy resins having an epoxy equivalency greater than 1.0 which comprises a mixture of (1) an accelerator of the general formula:

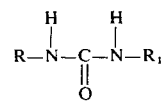

wherein R is

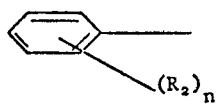

$R_2$ is selected from the group consisting of an alkyl group containing from 1 to 4 carbon atoms, chlorine and bromine, n is 0, 1 or 2, and $R_1$ is selected from the group consisting of R and H, and (2) a polyamine curing agent having more than one non-tertiary amino group per molecule.

2. A composition as in claim 1 wherein said polyamine curing agent is isophorone diamine.

3. A composition as in claim 1 wherein said accelerator is phenyl urea.

4. A composition as in claim 1 wherein said accelerator is 1,3-diphenyl urea.

* * * * *